United States Patent
Harada

(10) Patent No.: US 7,289,150 B2
(45) Date of Patent: Oct. 30, 2007

(54) SOLID-STATE IMAGE APPARATUS INCLUDING A PLURALITY OF HORIZONTAL TRANSFER REGISTERS FOR TRANSFERRING IMAGE SIGNALS FROM AN IMAGING AREA

(75) Inventor: Kouichi Harada, Kanagawa (JP)

(73) Assignee: Sony Corporation, Tokyo (JP)

( * ) Notice: Subject to any disclaimer, the term of this patent is extended or adjusted under 35 U.S.C. 154(b) by 566 days.

(21) Appl. No.: 09/910,604

(22) Filed: Jul. 20, 2001

(65) Prior Publication Data

US 2002/0071046 A1    Jun. 13, 2002

(30) Foreign Application Priority Data

Jul. 27, 2000 (JP) .......................... P2000-226449

(51) Int. Cl.
H04N 3/14 (2006.01)
H04N 5/335 (2006.01)

(52) U.S. Cl. ...................... 348/323; 348/321

(58) Field of Classification Search ................ 348/311, 348/294, 303, 323, 315, 316, 317, 319, 320, 348/321, 322, 302, 304, 305, 309, 308, 318, 348/324; 257/232, 241, 226, 242, 255, 231, 257/240, 370.08, 208.1, 208.2, 208.3, 208.4, 257/208.5; 250/208.1, 307.09; 358/906; 396/96

See application file for complete search history.

(56) References Cited

U.S. PATENT DOCUMENTS 4,559,550 A * 12/1985 Koike et al. ................ 257/233
4,837,630 A * 6/1989 Ueda .......................... 348/319
5,291,294 A * 3/1994 Hirota ........................ 348/316
5,742,659 A * 4/1998 Atac et al. ................. 378/98.8
5,969,759 A * 10/1999 Morimoto ................... 348/311
6,822,213 B2 * 11/2004 Stark ....................... 250/208.1
6,831,688 B2 * 12/2004 Lareau et al. ............... 348/272
2002/0118291 A1 * 8/2002 Ishigami et al. ............ 348/311

FOREIGN PATENT DOCUMENTS

| JP | 62-092587 | 4/1987 |
|---|---|---|
| JP | 63-117577 | 5/1988 |
| JP | 05-022667 | 1/1993 |

* cited by examiner

Primary Examiner—Vivek Srivastava
Assistant Examiner—Nelson D. Hernandez
(74) Attorney, Agent, or Firm—Robert J. Depke; Rockey, Depke & Lyons, LLC.

(57) ABSTRACT

In a CCD image apparatus in which an image section is horizontally divided into two areas, two horizontal CCDs are related to the two image areas with one-to-one correspondence and transfer the signal electric charges of the two image areas, and the two horizontal CCDs are driven in an identical direction by the same horizontal-driving pulses.

16 Claims, 6 Drawing Sheets

SOLID-STATE IMAGE APPARATUS INCLUDING A PLURALITY OF HORIZONTAL TRANSFER REGISTERS FOR TRANSFERRING IMAGE SIGNALS FROM AN IMAGING AREA

RELATED APPLICATION DATA

The present application claims priority to Japanese Application No. P2000-226449 filed Jul. 27, 2000, which application is incorporated herein by reference to the extent permitted by law.

BACKGROUND OF THE INVENTION

1. Field of the Invention

The present invention relates to solid-state image apparatuses, driving methods therefor, and camera systems, and more particularly, to a solid-state image apparatus having a plurality of horizontal transfer sections (horizontal transfer registers), a driving method therefor, and a camera system using the solid-state image apparatus as an image-pickup device.

2. Description of the Related Art

There have been known solid-state image apparatuses, such as charge-coupled-device (CCD) solid-state image apparatuses (hereinafter called CCD image apparatuses), in which an image section formed of pixels arranged two-dimensionally is divided, for example, into four areas, and each area is provided with a horizontal transfer register, in order to increase the number of pixels or to provide a higher electric-charge transfer speed (such apparatuses are disclosed, for example, in Japanese Unexamined Utility Model Publication No. Hei-1-175074 and Japanese Unexamined Patent Application Publication No. Hei-5-22667).

Specifically, as shown in FIG. 7, an image section 101 is divided, for example, into four areas 101A to 101D vertically and horizontally. Horizontal transfer registers 102A and 102B are provided above the image section 101 for the upper areas 101A and 101B, and horizontal transfer registers 102C and 102D are provided below the image section 101 for the lower areas 101C and 101D.

Signal electric charges in the upper areas 101A and 101B are vertically transferred to the upper direction to the horizontal transfer registers 102A and 102B, then, are horizontally transferred to the right and left directions by the horizontal transfer registers 102A and 102B, and are output through output sections 103A and 103B as output signals outA and outB. Signal electric charges in the lower areas 101C and 101D are vertically transferred to the lower direction to the horizontal transfer registers 102C and 102D, then, are horizontally transferred to the right and left directions by the horizontal transfer registers 102C and 102D, and are output through output sections 103C and 103D as output signals outC and outD.

In CCD image apparatuses for HDTV, two-channel horizontal transfer registers have already been implemented (they are disclosed, for example, in Japanese Unexamined Patent Application Publication No. Sho-62-92587 and Japanese Unexamined Patent Application Publication No. Sho-63-117577). Specifically, as shown in FIG. 8, two horizontal transfer registers 112A and 112B are disposed in parallel for an image section 111, signal electric charges are horizontally transferred in parallel in units of two lines by the horizontal transfer registers 112A and 112B, and the charges are output as output signals outA and outB through two output sections 113A and 113B.

In the former conventional technology, that is, in the CCD image apparatus in which the image section 101 is divided, for example, into four areas and each area is provided with a horizontal transfer register, however, since the horizontal transfer registers 102A and 102B are driven in directions opposite to each other, and the horizontal transfer registers 102C and 102D are driven in directions opposite to each other, it is necessary to have at least two-way horizontal transfer pulses in four-phase drive, for example. In two-phase drive, since the horizontal transfer registers 102A and 102B need to have mirror-image structures, and the horizontal transfer registers 102C and 102D also need to have mirror-image structures, discontinuities occur at their boundaries, causing vertical-line noise.

Because the output signals outA and outB are output in different directions and the output signals outC and outD are also output in different directions, it is necessary to apply re-arrangement processing to the output signals outB and outD in a subsequent signal processing system, and the system becomes complicated. In addition, the image section 101 cannot be divided into three or more areas horizontally.

In the latter conventional technology, that is, in the CCD image apparatus having the two-channel horizontal transfer registers 112A and 112B, since signal electric charges in the image section 111 need to be transferred to the horizontal transfer register 112B through the horizontal transfer register 112A, the transfer electrodes of the horizontal transfer register 112A also serve as those used for transferring signal electric charges from the image section 111 to the horizontal transfer register 112B. Therefore, the channel width of the horizontal transfer register 112A cannot be extended. As a result, the amount of electric charges handled by the horizontal transfer register 112A cannot be increased. To obtain a sufficient amount of electric charges to be handled, it is necessary to make the amplitude of driving pulses for the horizontal transfer registers larger.

SUMMARY OF THE INVENTION

The present invention has been made in consideration of the foregoing situations. Accordingly, it is an object of the present invention to provide a solid-state image apparatus having a plurality of horizontal transfer sections, a driving method therefor, and a camera system using the solid-state image apparatus as an image-pickup device, which eliminate vertical-line noise, provide a simple structure, can have three or more areas in the horizontal direction in an image section, and can extend the channel width of a horizontal transfer section.

In the present invention, a solid-state image apparatus includes an image section in which pixels are disposed two dimensionally in the horizontal direction and in the vertical direction and which is divided into a plurality of areas at least in the horizontal direction; and a plurality of electric-charge transfer sections provided outside the image section. The plurality of electric-charge transfer sections are related to the plurality of areas with one-to-one correspondence and transfer the signal electric charges of the corresponding areas, and the plurality of electric-charge transfer sections are driven in an identical direction.

In the above structure, the signal electric charges of each area obtained by dividing the image section into the plurality of areas are transferred to the corresponding electric-charge transfer section among the plurality of electric-charge transfer sections. Since the plurality of electric-charge transfer sections are driven in the identical direction, output signals formed of the signal electric charges of the plurality of areas are output in the identical direction.

The foregoing object is achieved in one aspect of the present invention through the provision of a solid-state image apparatus including an image section having a plurality of pixels arranged two dimensionally in the horizontal direction and in the vertical direction, the image section including a first area formed of a first pixel group and a second area formed of a second pixel group, and the first area and the second area being disposed adjacent to each other in the horizontal direction; a first electric-charge transfer section disposed outside the image area for transferring the signal electric charges of the first area in the horizontal direction; a second electric-charge transfer section disposed outside the image area for transferring the signal electric charges of the second area in the horizontal direction; and driving means for driving the first and second electric-charge transfer sections in an identical direction.

The foregoing object is achieved in another aspect of the present invention through the provision of a solid-state image device including an image section having a plurality of pixels arranged two dimensionally in the horizontal direction and in the vertical direction, the image section including a first area formed of a first pixel group and a second area formed of a second pixel group, and the first area and the second area being disposed adjacent to each other in the horizontal direction; a first electric-charge transfer section disposed outside the image area for transferring the signal electric charges of the first area in the horizontal direction; and a second electric-charge transfer section disposed outside the image area for transferring the signal electric charges of the second area in the horizontal direction, wherein the first electric-charge transfer section is disposed between the first area and the second electric-charge transfer section, and a transfer section for transferring the signal electric charges of the second area to the second electric-charge transfer section is disposed between the second area and the second electric-charge transfer section.

The foregoing object is achieved in still another aspect of the present invention through the provision of a driving method for a solid-state image device, the solid-state image device having: an image section having a plurality of pixels arranged two dimensionally in the horizontal direction and in the vertical direction, the image section including a first area formed of a first pixel group and a second area formed of a second pixel group, and the first area and the second area being disposed adjacent to each other in the horizontal direction; a first electric-charge transfer section disposed outside the image area for transferring the signal electric charges of the first area in the horizontal direction; and a second electric-charge transfer section disposed outside the image area for transferring the signal electric charges of the second area in the horizontal direction, the driving method including a step of transferring the signal electric charges of the first area to the first electric-charge transfer section; a step of transferring the signal electric charges of the second area to the second electric-charge transfer section without passing through the first electric-charge transfer section; and a step of driving the first and second electric-charge transfer sections in an identical direction to output signal charges.

The foregoing object is achieved in yet another aspect of the present invention through the provision of a camera system including a solid-state image apparatus, the solid-state image apparatus including an image section having a plurality of pixels arranged two dimensionally in the horizontal direction and in the vertical direction, the image section including a first area formed of a first pixel group and a second area formed of a second pixel group, and the first area and the second area being disposed adjacent to each other in the horizontal direction, a first electric-charge transfer section disposed outside the image area for transferring the signal electric charges of the first area in the horizontal direction, a second electric-charge transfer section disposed outside the image area for transferring the signal electric charges of the second area in the horizontal direction, and driving means for driving the first and second electric-charge transfer sections in an identical direction; an optical system for guiding incident light to the image section of the solid-state image apparatus; and a signal processing circuit for performing processing for combining output signals of the solid-state image apparatus to generate a signal corresponding to signal electric charges of one line in the image section, wherein the first electric-charge transfer section is disposed between the first area and the second electric-charge transfer section, and a transfer section for transferring the signal electric charges of the second area to the second electric-charge transfer section is disposed between the second area and the second electric-charge transfer section As described above, according to the present invention, in a solid-state image apparatus in which an image section is divided into a plurality of areas at least in the horizontal direction, since a plurality of electric-charge transfer sections are related to the plurality of areas with one-to-one correspondence, and transfer the signal electric charges of the corresponding areas, and the plurality of electric-charge transfer sections are driven in an identical direction, output signals formed of the signal electric charges of the plurality of areas are output in the identical direction. Therefore, the structure of a subsequent signal processing system is made simple.

DESCRIPTION OF THE PREFERRED EMBODIMENTS

Figure 1:
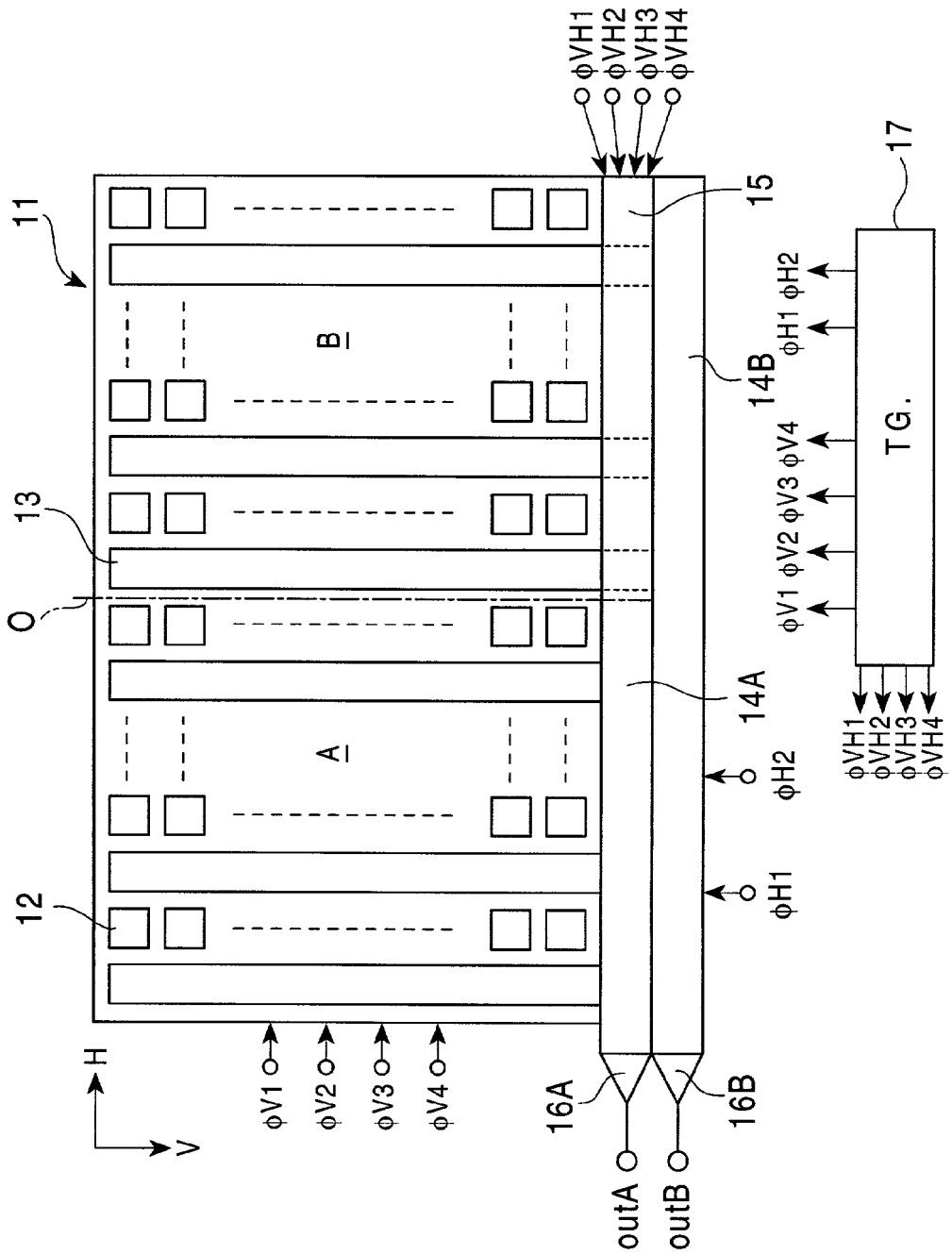
FIG. 1 is an outlined structural view of a CCD image apparatus according to an embodiment of the present invention.

Embodiments of the present invention will be described below in detail by referring to the drawings.

FIG. 1 is an outlined structural view of a CCD image apparatus according to an embodiment of the present invention.

In FIG. 1, an image section (image area) 11 has a plurality of sensor sections (pixels) 12 arranged two dimensionally in the horizontal direction H and the vertical direction V. The sensor sections 12 each are formed, for example, of a PN-junction photodiode, and convert incident light to a signal electric charge corresponding to the amount of the light and accumulate it.

The image section 11 is also provided with vertical CCDs (vertical transfer sections) 13 disposed in the direction in which pixels are arranged, correspondingly to the vertical columns of the sensor sections 12. The vertical CCDs 13 are driven, for example, by four-phase vertical driving pulses φV1 to φV4 to vertically transfer signal electric charges read from the sensor sections 12.

The imaging area of the image section 11 is divided into two areas, an image area A and an image area B, at nearly the center part in the horizontal direction, as shown by a one-dot-chain line (division line) O in FIG. 1, for example. The division is for a driving purpose. The image areas A and B have the same sensor sections 12 and the vertical CCDs 13 in terms of their structures.

Below the image section 11, that is, at the destination where the vertical CCDs 13 transfer signal electric charges, two horizontal CCDs (horizontal transfer sections) 14A and 14B for horizontally transferring signal electric charges vertically transferred from the vertical CCDs 13 sequentially are disposed in parallel. The horizontal CCDs 14A and 14B use, for example, two-phase horizontal driving pulses φH1 and φH2 as common driving signals, and are driven in an identical direction (in the present embodiment, from the right to left direction in the figure) by the driving pulses φH1 and φH2.

The horizontal CCDs 14A and 14B are provided for the image areas A and B with one-to-one correspondence. More specifically, the horizontal CCD 14A transfers signal electric charges sent from the image area A, and the horizontal CCD 14B transfers signal electric charges sent from the image area B. To this end, the horizontal CCD 14A is formed so as to reach just the division line O in the image section 11.

In contrast, the horizontal CCD 14B is, for example, twice as long as the horizontal CCD 14A, namely, is formed over the entire image section 11 in the horizontal direction. At a subsequent part of the horizontal CCD 14A, that is, between the image area B of the image section 11 and the second half of the horizontal CCD 14B, a VH transfer section 15 is provided which directly transfers signal electric charges sent from the image area B to the second half of the horizontal CCD 14B.

Since the VH transfer section 15 just transfers signal electric charges from the image area B to the horizontal CCD 14B, its structure can be the same as that of the vertical CCDs 13. The number of transfer stages in the VH transfer section 15 can be set to any value according to the channel width of the horizontal CCD 14A.

At the ends of the transfer-destination sides of the horizontal CCDs 14A and 14B, output sections 16A and 16B formed, for example, of floating diffusion amplifiers are disposed. The output sections 16A and 16B convert signal electric charges sequentially sent by the horizontal CCDs 14A and 14B to the signal voltages outA and outB and output them.

A timing generator (TG) 17 generates various timing signals, including the four-phase vertical-driving pulses φV1 to φV4 for driving the vertical CCDs 13, four-phase vertical-driving pulses φVH1 to φVH4 for driving the VH transfer section 15, and the two-phase horizontal-driving pulses φH1 and φH2 for driving the horizontal CCDs 14A and 14B. In other words, the timing generator 17 serves as driving means for driving the vertical CCDs 13, the VH transfer section 15, and the horizontal CCDs 14A and 14B.

By referring to a view of operations shown in FIG. 2, an example case in which the CCD image apparatus according to the present embodiment having the above structure is driven will be described next. To provide easier understanding, it is assumed here that the number of pixels in the horizontal direction is set to eight. Symbol ① is assigned to the signal electric charges of pixels disposed in a first row from the bottom, symbol ② is assigned to the signal electric charges of pixels disposed in a second row, symbol ③ is assigned to the signal electric charges of pixels disposed in a third row, and so on.

Figure 2A:
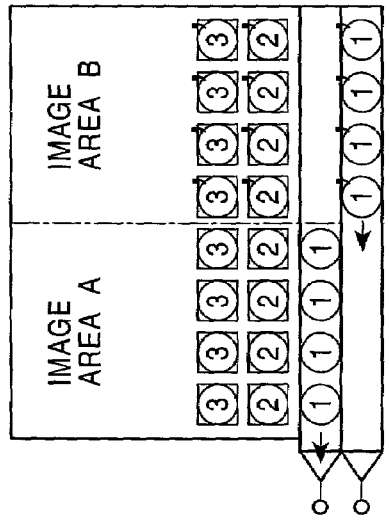
FIG. 2 is a view showing a case in which the CCD image apparatus according to the present embodiment is driven.

Signal electric charges accumulated in pixels (sensor sections 12) are all read into the vertical CCDs 13 (shown in FIG. 2A). The vertical CCDs 13 shift the signal electric charges by one line (by one row). The VH transfer section 15 continues transfer operations for a predetermined number of stages. With these operations, the signal electric charges ① at the first row of the image area A are transferred to the horizontal CCD 14A, and the signal electric charges ①' at the first row of the image area B are transferred through the VH transfer section 15 to the second half of the horizontal CCD 14B (shown in FIG. 2B).

Figure 2B:
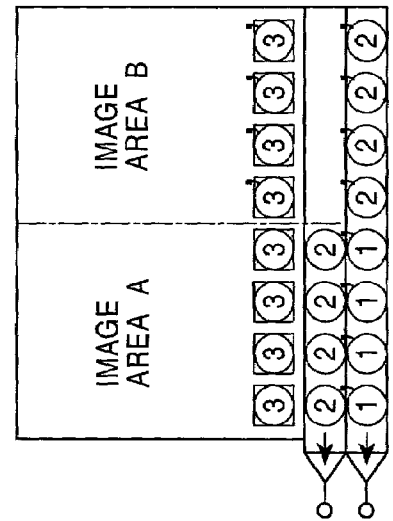

The identical horizontal driving pulses φH1 and φH2 are applied to the horizontal CCDs 14A and 14B at the condition shown in FIG. 2B to drive the horizontal CCDs 14A and 14B in an identical direction by the number of transfer stages of the horizontal CCD 14A. With this operation, the signal electric charges ① at the first row of the image area A are converted to the signal voltage outA at the output section 16A, and the signal electric charges ①' at the first row of the image area B are transferred from the second half of the horizontal CCD 14B to the first half and accumulated there (shown in FIG. 2C).

Figure 2C:
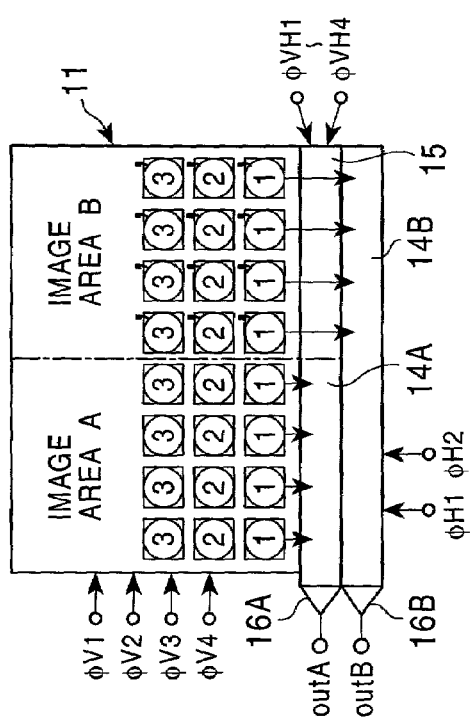
Figure 2D:
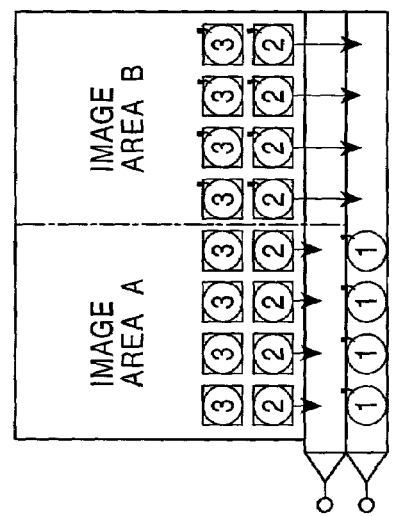

Next, a line shift is again performed in the vertical CCDs 13 at the condition shown in FIG. 2C. The VH transfer section 15 continues a transfer operation. With these operations, the signal electric charges ② at the second row of the image area A are transferred to the horizontal CCD 14A, and the signal electric charges ②' at the second row of the image area B are transferred through the VH transfer section 15 to the second half of the horizontal CCD 14B. As a result, the horizontal CCD 14B accumulates the signal electric charges ①' at the first row of the image area B in its first half and the signal electric charges ②' at the second row of the image area B at its second half (shown in FIG. 2D).

Then, the horizontal CCDs 14A and 14B are driven in the identical direction by the number of transfer stages of the horizontal CCD 14A. The signal electric charges ② at the second row of the image area A are converted to the signal voltage outA at the output section 16A and output. The signal electric charges ①' at the first row of the image area B are converted to the signal voltage outB at the output section 16B and output. At this point of time, a signal formed of the signal electric charges ① at the first row of the image section 11 is all output. The same operations are repeated afterwards.

As described above, in the CCD image apparatus in which the image section 11 is horizontally divided, for example, into two areas, the two horizontal CCDs 14A and 14B are related to the image areas A and B with one-to-one correspondence and handle transfer of signal electric charges in the areas A and B; and the two horizontal CCDs 14A and 14B are driven in the identical direction by the same horizontal driving pulses φH1 and φH2. Therefore, the following advantages are obtained.

Since the signal outB output from the output section 16B is delayed from the signal outA output from the output section 16A by the period corresponding to the signal period of one row of each of the image areas A and B, it is not necessary to re-arrange the output signal outA or outB in a subsequent signal processing system. A signal process for just connecting the output signal outB to the end of the output signal outA is repeatedly required. Therefore, the signal processing system has a simple structure.

Since each of the two horizontal CCDs 14A and 14B has a uniform structure, is continuous, and has no connection point, vertical-line noise is prevented, which occurs in the conventional technology at a connection point.

In addition, the horizontal CCD 14A, disposed close to the image section 11, needs to perform horizontal transfer only, and does not need to transfer signal electric charges from the image section 11 to the horizontal CCD 14B. In other words, the transfer electrodes of the horizontal CCD 14A do not need to also serve as those for transferring signal electric charges from the image section 11 to the horizontal CCD 14B, the transfer channel of the horizontal CCD 14A can be widened. As a result, the horizontal CCDs 14A and 14B can be driven at a higher speed, and the amplitudes of the horizontal driving pulses φH1 and φH2 can be reduced.

In the CCD image apparatus according to the present embodiment, the channel length of the horizontal CCD 14B is set nearly twice as long as that of the horizontal CCD 14A. The structure of the CCD image apparatus is not limited to this structure. The channel lengths of the horizontal CCDs 14A and 14B can be set nearly equal.

In this case, signal electric charges in the image areas A and B can be output at the same time in units of rows. Delay means for delaying the output signal outB by the period corresponding to the signal period of one row of each of the image areas A and B needs to be provided for the signal processing system, in order to repeatedly perform a signal process for connecting the output signal outB to the end of the output signal outA.

By referring to a view of operations shown in FIG. 3, another example case in which the CCD image apparatus according to the present embodiment is driven will be described next. To provide easier understanding, it is assumed here that the number of pixels in the horizontal direction is set to eight. Symbol ① is assigned to the signal electric charges of pixels disposed in a first row from the bottom, symbol ② is assigned to the signal electric charges of pixels disposed in a second row, symbol ③ is assigned to the signal electric charges of pixels disposed in a third row, and so on.

Figure 3A:
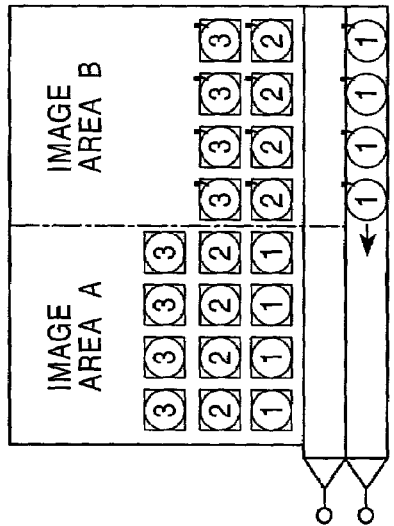
FIG. 3 is a view showing another case in which the CCD image apparatus according to the present embodiment is driven.

In this case, as driving signals for the vertical CCDs 13, it is assumed that two-way signals are used, vertical-driving pulses φV1A to φV4A for the image area A and vertical-driving pulses φV1B to φV4B for the image area B (see FIG. 3A).

Signal electric charges accumulated in pixels are all read into the vertical CCDs 13 (shown in FIG. 3A). The vertical-driving pulses φV1B to φV4B are applied to the vertical CCDs 13 disposed in the image area B to shift the signal electric charges by one line. The image area B and the VH transfer section 15 continue transfer operations. With these operations, the signal electric charges ①' at the first row of the image area B are transferred through the VH transfer section 15 to the second half of the horizontal CCD 14B (shown in FIG. 3B).

Figure 3B:
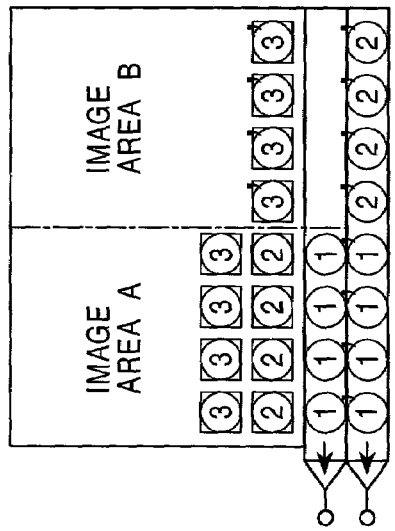

The identical horizontal driving pulses φH1 and φH2 are applied to the horizontal CCDs 14A and 14B at the condition shown in FIG. 3B to drive the horizontal CCDs 14A and 14B in an identical direction by the number of transfer stages of the horizontal CCD 14A. With this operation, the signal electric charges ①' at the first row of the image area B are transferred to the first half of the horizontal CCD 14B and accumulated there (shown in FIG. 3C). Since the horizontal CCD 14A does not yet have signal electric charges, dummy transfer is performed in the horizontal CCD 14A.

Figure 3C:
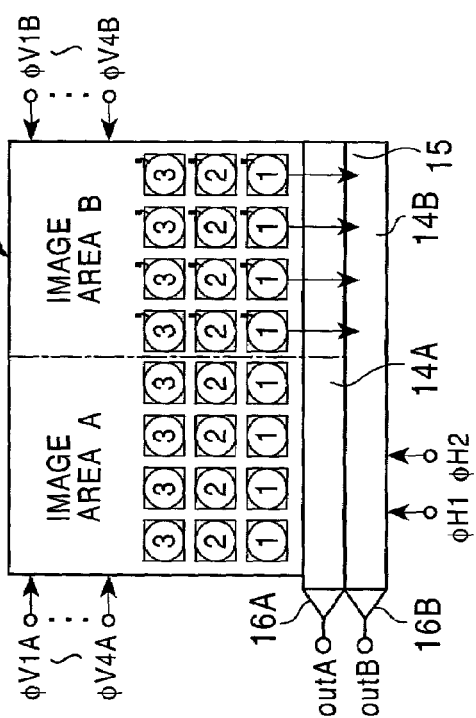

Next, the vertical-driving pulses φV1A to φV4A and the vertical-driving pulses φV1B to φV4B are applied to perform line shifts in both the image area A and image area B at the condition shown in FIG. 3C. The image area B and the VH transfer section 15 continue transfer operations. With these operations, the signal electric charges ① at the first row of the image area A are transferred to the horizontal CCD 14A, and the signal electric charges ②' at the second row of the image area B are transferred through the VH transfer section 15 to the second half of the horizontal CCD 14B (shown in FIG. 3D).

Figure 3D:
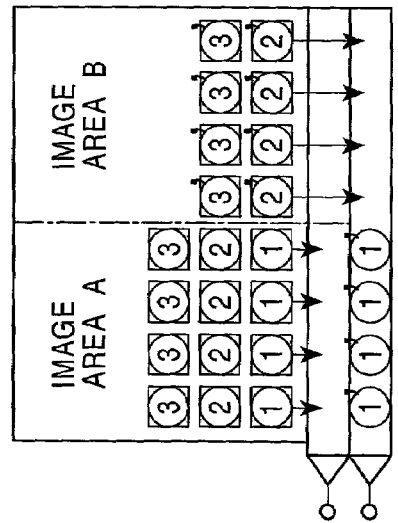

Then, the horizontal CCDs 14A and 14B are driven in the identical direction by the number of transfer stages of the horizontal CCD 14A at the condition shown in FIG. 3D. The signal electric charges ① at the first row of the image area A are converted to a signal voltage outA at the output section 16A and output. The signal electric charges ①' at the first row of the image area B are converted to a signal voltage outB at the output section 16B and output. The signal electric charges ②' at the second row of the image area B are transferred from the second half of the horizontal CCD 14B to the first half and accumulated there (shown in FIG. 3E).

Next, the vertical-driving pulses φV1A to φV4A and the vertical-driving pulses φV1B to φV4B are applied to perform line shifts in both the image area A and image area B at the condition shown in FIG. 3E. The image area B and the VH transfer section 15 continue transfer operations. With these operations, the signal electric charges ② at the second row of the image area A are transferred to the horizontal CCD 14A, and the signal electric charges ③' at the third row of the image area B are transferred through the VH transfer section 15 to the second half of the horizontal CCD 14B (shown in FIG. 3F).

Then, the horizontal CCDs 14A and 14B are driven in the identical direction by the number of transfer stages of the horizontal CCD 14A at the condition shown in FIG. 3F. The signal electric charges ② at the second row of the image area A are converted to a signal voltage outA at the output section 16A and output. The signal electric charges ②' at the second row of the image area B are converted to a signal voltage outB at the output section 16B and output. The same operations are repeated afterwards.

Also in this driving case, the output signals outA and outB are output in the identical direction, in the same way as in the previous driving case. In the present driving case, however, since the signal electric charges of the image areas A and B are output at the same time in units of rows, it is necessary to provide the signal processing system with delay means for delaying the output signal outB by the period corresponding to the signal period of one row of each of the image areas A and B in order to connect the output signal outB to the end of the output signal outA in each row.

In a CCD image apparatus which employs the present operation case, the channel length of the horizontal CCD 14B can be set nearly equal to that of the horizontal CCD 14A, instead of being set nearly twice as long as that of the horizontal CCD 14A.

Figure 4:
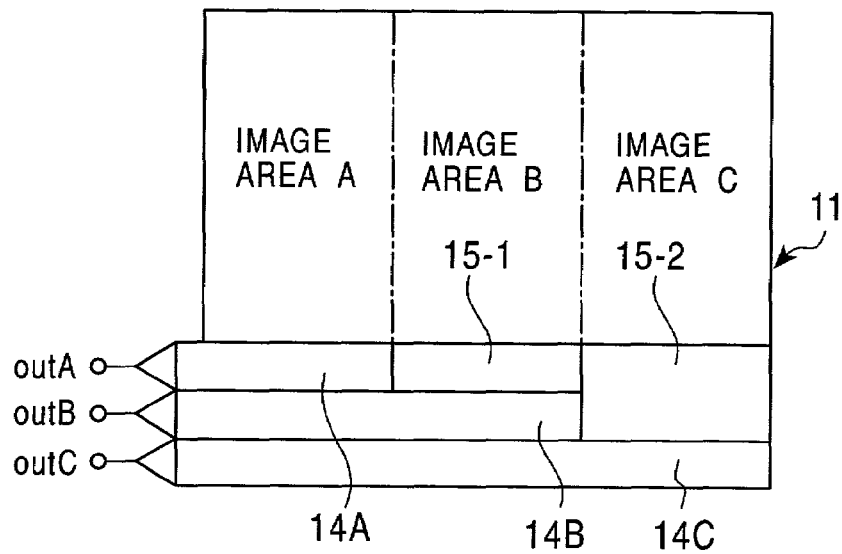
FIG. 4 is an outlined structural view of a modification of the CCD image apparatus of the present embodiment.

In the CCD image apparatus according to the above embodiments, the image section 11 is horizontally divided into two areas. The number of divisions can be set to any number. As shown in FIG. 4, for example, the image section 11 can be divided into three areas. In this case, three horizontal CCDs 14A, 14B, and 14C for horizontally transferring signal electric charges are provided for three image areas A, B, and C with one-to-one correspondence.

In addition, a VH transfer section 15-1 is disposed between the image area B and the second half of the horizontal CCD 14B, and a VH transfer section 15-2 is disposed between the image area C and the end part of the horizontal CCD 14C. The number of transfer stages in the VH transfer section 15-1 is specified according to the channel width of the horizontal CCD 14A, and the number of transfer stages in the VH transfer section 15-2 is specified according to the channel widths of the horizontal CCDs 14A and 14B.

In an example usage case of the CCD image apparatus according to the present modification, when only an output signal outC obtained by the transfer operation of the outermost horizontal CCD 14C is taken out, three-times faster driving is implemented for the image area C.

When the number of divisions is set to an odd number, such as three, if driving is achieved such that signal electric charges are read from any areas among the center image area and a plurality of image areas disposed at both sides thereof and signal electric charges are not read from the remaining areas, so-called thinning-out driving in the horizontal direction is implemented, in which the optical center remains as is and pixel information is thinned out in the horizontal direction.

In the CCD image apparatus according to the above embodiments, the image area 11 is divided only in the horizontal direction. Division is not limited to that in the horizontal direction. It is possible that the number of divisions in the horizontal direction is set to any number, and in addition, the image section is divided into two areas in the vertical direction.

Figure 5:
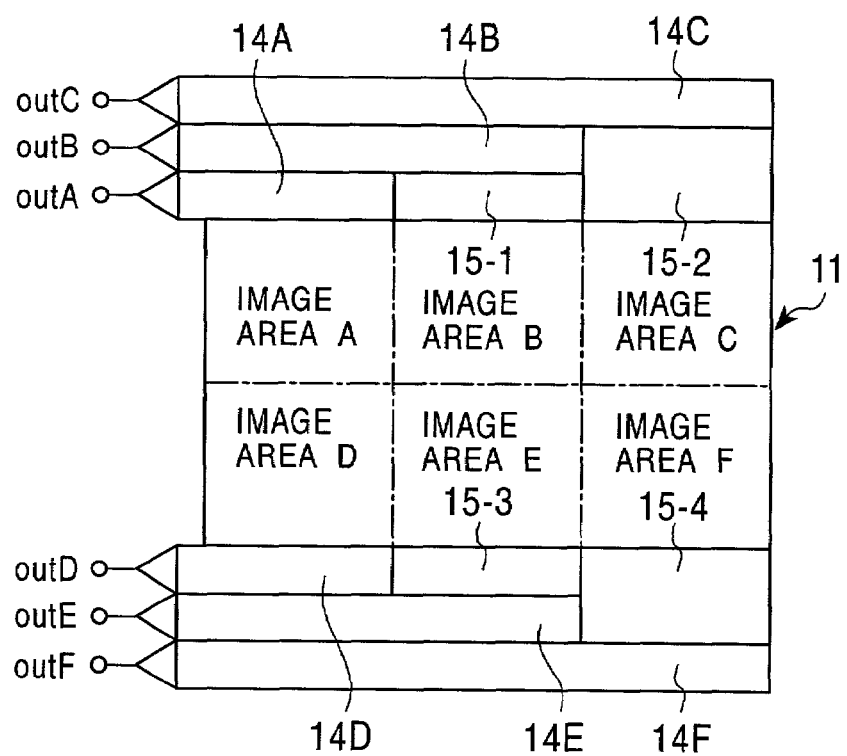
FIG. 5 is an outlined structural view of another modification of the CCD image apparatus of the present embodiment.

As an example of this type of division, it can be considered that the image section 11 is divided in the horizontal direction into three areas and in the vertical direction into two areas, namely, into a total of six areas, as shown in FIG. 5. In this case, three horizontal CCDs 14A, 14B, and 14C for horizontally transferring signal electric charges are provided at the upper side of the image section 11 for three upper image areas A, B, and C, and three horizontal CCDs 14D, 14E, and 14F for horizontally transferring signal electric charges are provided at the lower side of the image section 11 for three image areas D, E, and F.

Furthermore, a VH transfer section 15-1 is disposed between the image area B and the second half of the horizontal CCD 14B, a VH transfer section 15-2 is disposed between the image area C and the end part of the horizontal CCD 14C, a VH transfer section 15-3 is disposed between the image area E and the second half of the horizontal CCD 14E, and a VH transfer section 15-4 is disposed between the image area F and the end part of the horizontal CCD 14F. The numbers of transfer stages in the VH transfer sections 15-1 and 15-3 are specified according to the channel widths of the horizontal CCDs 14A and 14D, respectively, the number of transfer stages in the VH transfer section 15-2 is specified according to the channel widths of the horizontal CCDs 14A and 14B, and the number of transfer stages in the VH transfer section 15-4 is specified according to the channel widths of the horizontal CCDs 14D and 14E.

Also in this six-division case, the horizontal CCDs 14A to 14F are driven by the same horizontal-driving pulses φH1 and φH2 in the same direction.

Figure 6:
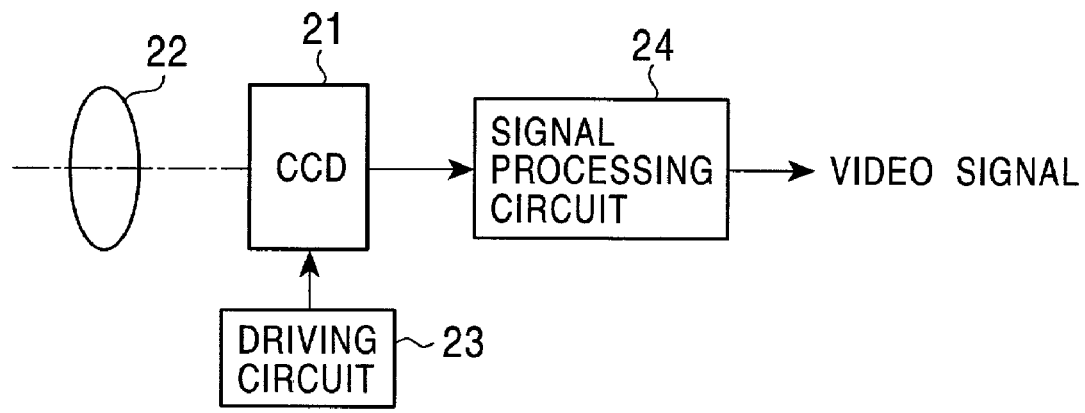
FIG. 6 is an outlined block diagram of a camera system according to the present invention.
Figure 7:
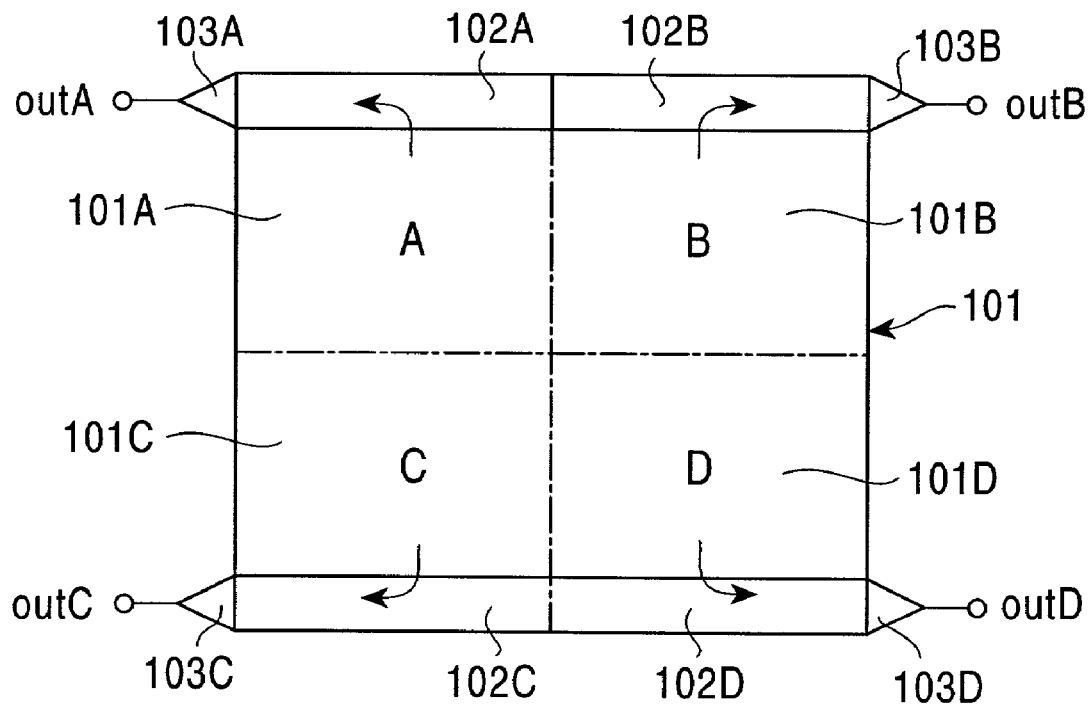
FIG. 7 is an outlined structural view of a conventional solid-state image apparatus.
Figure 8:
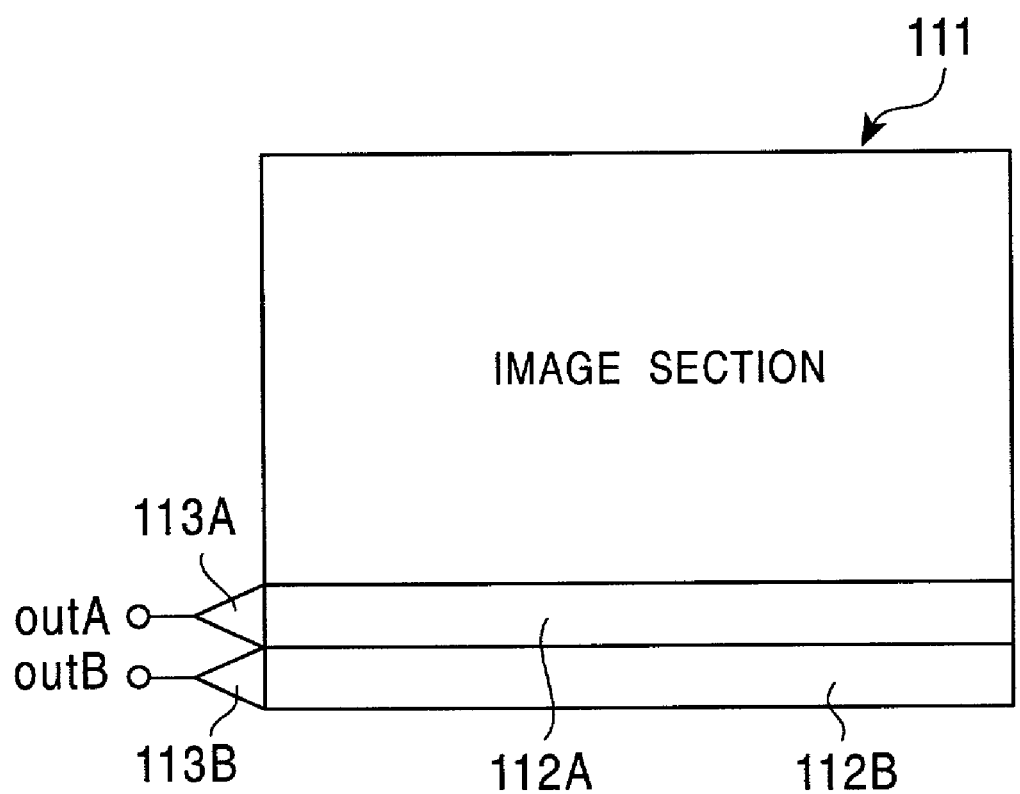
FIG. 8 is an outlined structural view of another conventional solid-state image apparatus.

FIG. 6 is a block diagram of an outlined structure of a camera system according to the present invention. The camera system includes an image-pickup device 21; an optical system for guiding incident light to the image section of the image-pickup device 21, such as a lens 22 for imaging incident light (image light) on an image plane; a driving circuit 23 for driving the image-pickup device 21; and a signal processing circuit 24 for processing the output signal of the image-pickup device 21.

In this camera system, a solid-state image apparatus according to one of the above-described embodiments is used as the image-pickup device 21. In other words, in the used CCD image apparatus, an image section is at least horizontally divided into a plurality of areas, each area is provided with a horizontal CCD for transferring the signal electric charges of the area, and a plurality of horizontal CCDs are driven in an identical direction by the same horizontal-driving pulses.

The driving circuit 23 has the timing generator 17 shown in FIG. 1, and drives the image-pickup device 21 so as to achieve driving described in one of the above-described operation examples. The signal processing circuit 24 applies various types of signal processing to the output signal of the image-pickup device 21 to output a video signal. As an example of signal processing, in the operation case shown in FIG. 2, the output signal outB is connected to the end of the output signal outA to generate a signal corresponding to signal electric charges of one line (one row) of the image section 11.

In the operation case shown in FIG. 3, since the signal charges of the image areas A and B are output at the same time in units of rows as the output signals outA and outB, the output signal outB is delayed for the time corresponding to the signal period in one row of each of the image areas A and B and then, the output signal outB is connected to the end of the output signal outA to generate a signal corresponding to signal electric charges of one line (one row) of the image section 11. The signal processing section 24 performs not only the signal processing described above but also usual camera signal processing.

Since a CCD image apparatus according to one of the above-described embodiments is used as the image-pickup device in the camera system in this way, even when a plurality of horizontal CCDs are provided in order to make the screen of the CCD image apparatus larger, to make the apparatus have a higher resolution, and to make the apparatus have a higher speed, these horizontal CCDs transfer in an identical direction and it is not necessary to re-arrange the output signal. Therefore, the structure of the signal processing circuit 24 is made simple.

What is claimed is:

1. A solid-state image apparatus comprising:
   an image section having a plurality of pixels arranged two dimensionally in the horizontal direction and in the vertical direction,
   the image section comprising a first area formed of a first pixel group and a second area formed of a second pixel group, and the first area and the second area being disposed adjacent to each other in the horizontal direction;
   a first electric-charge transfer section disposed outside the image area for transferring signal electric charges of the first area in the horizontal direction;
   a second electric-charge transfer section extending across the entire width of the image section and disposed outside the image area for transferring signal electric charges of the second area in the horizontal direction;

further comprising a vertical transfer section for transferring the signal electric charges of the second area to the second electric-charge transfer section without passing through the first electric-charge transfer section, and driving means for driving the first and second electric-charge transfer sections in an identical direction, wherein the first and second electric-charge transfer sections are disposed such that the first electric-charge transfer section transfers only the signal electric charges of the first area and the second electric-charge transfer section transfers only the signal electric charges of the second area;

wherein the first electric-charge transfer section is disposed between the first area and the second electric-charge transfer section, wherein the vertical transfer section is disposed between the second area and the second electric-charge transfer section, and wherein all of the pixels in any one column of said image section to be read out of the solid-state image apparatus are transferred to only one of said first electric-charge transfer section and said second electric-charge transfer section.

2. The solid-state image apparatus according to claim 1, wherein the driving means drives the first and second electric-charge transfer sections by an identical driving signal.

3. The solid-state image apparatus according to claim 1, wherein the second electric charge transfer section extending across the entire width of the image section is positioned adjacent said first charge transfer section such that an output for the first charge transfer section is substantially immediately adjacent an output for the second charge transfer section.

4. The solid-state image apparatus according to claim 1, wherein the first electric charge transfer section does not extend across the entire width of the image section.

5. A solid-state image device comprising:
   an image section having a plurality of pixels arranged two dimensionally in the horizontal direction and in the vertical direction,
   the image section comprising a first area formed of a first pixel group and a second area formed of a second pixel group, and the first area and the second area being disposed adjacent to each other in the horizontal direction;
   a first electric-charge transfer section disposed outside the image area for transferring the signal electric charges of the first area in the horizontal direction;
   a second electric-charge transfer section extending across the entire width of the image section and disposed outside the image area for transferring the signal electric charges of the second area in the horizontal direction; and
   a vertical transfer section for transferring the signal electric charges of the second area to the second electric-charge transfer section,
   wherein the first electric-charge transfer section is disposed between the first area and the second electric-charge transfer section, and the vertical transfer section is disposed between the second area and the second electric-charge transfer section, and
   wherein all of the pixels in any one column of said image section to be read out of the solid-state image apparatus are transferred to only one of said first electric-charge transfer section and said second electric-charge transfer section.

6. A driving method for a solid-state image device, the solid-state image device having: an image section having a plurality of pixels arranged two dimensionally in the horizontal direction and in the vertical direction, the image section having a first area formed of a first pixel group and a second area formed of a second pixel group, and the first area and the second area being disposed adjacent to each other in the horizontal direction; a first electric-charge transfer section disposed outside the image area for transferring the signal electric charges of the first area in the horizontal direction; and a second electric-charge transfer section extending across the entire width of the image section and disposed outside the image area for transferring the signal electric charges of the second area in the horizontal direction, the driving method comprising:
   a step of transferring the signal electric charges of the first area to the first electric-charge transfer section;
   a step of transferring the signal electric charges of the second area to the second electric-charge transfer section without passing through the first electric-charge transfer section;
   a step of driving the first and second electric-charge transfer sections in an identical direction to output signal charges; and
   a step of transferring the signal electric charges of the second area to the second electric-charge transfer section without passing through the first electric-charge transfer section via a vertical transfer section thereby transferring the signal electric charges of the second area to the second electric-charge transfer section without passing through the first electric-charge transfer section,
   wherein the first electric-charge transfer section is disposed between the first area and the second electric-charge transfer section,
   wherein the vertical transfer section is disposed between the second area and the second electric-charge transfer section, and
   wherein all of the pixels in any one column of said image section to be read out of the solid-state image apparatus are transferred to only one of said first electric-charge transfer section and said second electric-charge transfer section.

7. A camera system comprising:
   a solid-state image apparatus,
   the solid-state image apparatus comprising:
   an image section comprising a plurality of pixels arranged two dimensionally in the horizontal direction and in the vertical direction, the image section comprising a first area formed of a first pixel group and a second area formed of a second pixel group, and the first area and the second area being disposed adjacent to each other in the horizontal direction;
   a first electric-charge transfer section disposed outside the image area for transferring the signal electric charges of the first area in the horizontal direction;
   a second electric-charge transfer section extending across the entire width of the image section and disposed outside the image area for transferring the signal electric charges of the second area in the horizontal direction;
   driving means for driving the first and second electric-charge transfer sections in an identical direction;
   a vertical transfer section for transferring the signal electric charges of the second area to the second electric-charge transfer section;

an optical system for guiding incident light to the image section of the solid-state image apparatus; and a signal processing circuit for combining output signals of the solid-state image apparatus to generate a signal corresponding to signal electric charges of one line in the image section, wherein the first electric-charge transfer section is disposed between the first area and the second electric-charge transfer section, and the vertical transfer section is disposed between the second area and the second electric-charge transfer section, and wherein all of the pixels in any one column of said image section to be read out of the solid-state image apparatus are transferred to only one of said first electric-charge transfer section and said second electric-charge transfer section.

8. A solid-state image apparatus comprising:

an image section having a plurality of pixels arranged two dimensionally in the horizontal direction and in the vertical direction, the image section comprising a first area formed of a first pixel group and a second area formed of a second pixel group, and the first area and the second area being disposed adjacent to each other in the horizontal direction;

a first electric-charge transfer section disposed outside the image area for transferring the signal electric charges of the first area in the horizontal direction;

a second electric-charge transfer section extending across the entire width of the image section and disposed outside the image area for transferring the signal electric charges of the second area in the horizontal direction;

further comprising a vertical transfer section for transferring the signal electric charges of the second area to the second electric-charge transfer section without passing through the first electric-charge transfer section; and driving means for driving the first and second electric-charge transfer sections in an identical direction, wherein the first and second electric-charge transfer sections are disposed such that the first electric-charge transfer section transfers only the signal electric charges of the first area and the second electric-charge transfer section transfers only the signal electric charges of the second area;

wherein the first electric-charge transfer section is disposed between the first area and the second electric-charge transfer section, wherein the vertical transfer section is disposed between the second area and the second electric-charge transfer section, and wherein the electric charges of said first area are transferred directly from said first area to said first electric-charge transfer section without passing through any additional vertical transfer section between the first image area and the first electric-charge transfer section.

9. The solid-state image apparatus according to claim 8, further wherein said first pixel group comprising said first area are comprised of a first plurality of immediately adjacent pixels in both the vertical and horizontal direction; and said second pixel group comprising said second area are comprised of a second plurality of immediately adjacent pixels in both the vertical and horizontal direction.

10. The solid-state image apparatus according to claim 8, wherein the second electric charge transfer section extending across the entire width of the image section is positioned adjacent said first charge transfer section such that an output for the first charge transfer section is substantially immediately adjacent an output for the second charge transfer section.

11. The solid-state image apparatus according to claim 8, wherein the first electric charge transfer section does not extend across the entire width of the image section.

12. The solid-state image apparatus according to claim 8, wherein the image section is further comprised of third and fourth areas formed of a third and fourth pixel group, the third pixel area being disposed adjacent the first pixel area in the vertical direction, the fourth pixel area being disposed adjacent the second pixel area in the vertical direction, and the third and fourth pixel areas being disposed adjacent one another in the horizontal direction; the solid-state image apparatus further comprising:

a third electric-charge transfer section is disposed outside the image area for transferring signal electric charges of the third area in the horizontal direction;

a fourth electric-charge transfer section extending across the entire width of the image section is disposed outside the image area for transferring signal electric charges of the fourth area in the horizontal direction; and a vertical transfer section for transferring the signal electric charges of the fourth area to the fourth electric-charge transfer section without passing through the third electric-charge transfer section;

wherein said driving means also drives the third and fourth electric-charge transfer sections in an identical direction;

wherein the third and fourth electric-charge transfer sections are disposed such that the third electric-charge transfer section transfers only the signal electric charges of the third area and the fourth electric-charge transfer section transfers only the signal electric charges of the fourth area;

wherein the third electric-charge transfer section is disposed between the third area and the fourth electric-charge transfer section;

wherein the vertical transfer section is disposed between the fourth area and the fourth electric-charge transfer section; and wherein the electric charges of said third area are transferred directly from said third area to said third electric-charge transfer section without passing through any additional vertical transfer section between the third image area and the third electric-charge transfer section.

13. A solid-state image apparatus comprising:

an image section having a plurality of pixels arranged two dimensionally in the horizontal direction and in the vertical direction, the image section comprising a first area formed of a first pixel group and a second area formed of a second pixel group, said first pixel group is comprised of a first plurality of immediately adjacent pixels in both the vertical and horizontal direction; and said second pixel group is comprised of a second plurality of immediately adjacent pixels in both the vertical and horizontal direction, the first area and the second area being disposed adjacent to each other in the horizontal direction;

a first electric-charge transfer section disposed outside the image area for transferring the signal electric charges of the first area in the horizontal direction, said first electric-charge transfer section does not extend across the entire width of the image section;

a second electric-charge transfer section extending across the entire width of the image section and disposed outside the image area for transferring the signal electric charges of the second area in the horizontal direction; and further comprising a vertical transfer section for transferring the signal electric charges of the second area to the second electric-charge transfer section without passing through the first electric-charge transfer section; and driving means for driving the first and second electric-charge transfer sections in an identical direction, wherein the first and second electric-charge transfer sections are disposed such that the first electric-charge transfer section transfers only the signal electric charges of the first area and the second electric-charge transfer section transfers only the signal electric charges of the second area.

14. The solid-state image apparatus according to claim 13, wherein the image section is further comprised of third and fourth areas formed of a third and fourth pixel group, the third pixel group being comprised of a third plurality of immediately adjacent pixels in both the vertical and horizontal direction and the fourth pixel group being comprised of a fourth plurality of immediately adjacent pixels in both the vertical and horizontal direction, the third pixel area being disposed adjacent the first pixel area in the vertical direction, the fourth pixel area being disposed adjacent the second pixel area in the vertical direction, and the third and fourth pixel areas being disposed adjacent one another in the horizontal direction, the solid-state image apparatus further comprising:

a third electric-charge transfer section is disposed outside the image area for transferring signal electric charges of the third area in the horizontal direction;

a fourth electric-charge transfer section extending across the entire width of the image section is disposed outside the image area for transferring signal electric charges of the fourth area in the horizontal direction; and a vertical transfer section for transferring the signal electric charges of the fourth area to the fourth electric-charge transfer section without passing through the third electric-charge transfer section;

wherein said driving means also drives the third and fourth electric-charge transfer sections in an identical direction;

wherein the third and fourth electric-charge transfer sections are disposed such that the third electric-charge transfer section ttansfers only the signal electric charges of the third area and the fourth electric-charge transfer section transfers only the signal electric charges of the fourth area.

15. A solid-state image apparatus comprising:

an image section having a plurality of pixels arranged two dimensionally in the horizontal direction and in the vertical direction, the image section comprising a plurality of areas each comprised of a group of pixels, each group of pixels is comprised of a plurality of immediately adjacent pixels in both the vertical and horizontal direction; the plurality of areas being arranged adjacent in the horizontal and/or vertical direction;

a plurality of electric-charge transfer sections disposed outside the image area for transferring the signal electric charges of each of the plurality of areas, respectively, in the horizontal direction, wherein at least one of the electric-charge transfer sections extends across the entire width of the image section, and at least another of the electric-charge transfer sections does not extend across the entire width of the image section; and driving means for driving the plurality of electric-charge transfer sections in an identical direction, wherein the plurality of electric-charge transfer sections are disposed such that each electric-charge transfer section transfers only the signal electric charges of one of said plurality of areas.

16. The solid-state image apparatus according to claim 15, wherein the remaining electric charge transfer sections of said plurality of electric charge transfer sections, besides said at least one electric-charge transfer section which extends across the entire width of the image section, do not extend across the entire width of the image section.

* * * * *